United States Patent
Song et al.

(10) Patent No.: US 12,237,520 B2
(45) Date of Patent: Feb. 25, 2025

(54) CYLINDRICAL BATTERY

(71) Applicant: LG ENERGY SOLUTION, LTD., Seoul (KR)

(72) Inventors: Hyeon Min Song, Daejeon (KR); Duk Hyun Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 564 days.

(21) Appl. No.: 17/618,737

(22) PCT Filed: Jul. 7, 2020

(86) PCT No.: PCT/KR2020/008829
§ 371 (c)(1),
(2) Date: Dec. 13, 2021

(87) PCT Pub. No.: WO2021/006589
PCT Pub. Date: Jan. 14, 2021

(65) Prior Publication Data
US 2022/0247019 A1 Aug. 4, 2022

(30) Foreign Application Priority Data
Jul. 11, 2019 (KR) ........................ 10-2019-0083862

(51) Int. Cl.
*H01M 50/152* (2021.01)
*H01M 50/107* (2021.01)
*H01M 50/574* (2021.01)
*H01M 50/586* (2021.01)

(52) U.S. Cl.
CPC ....... *H01M 50/152* (2021.01); *H01M 50/107* (2021.01); *H01M 50/574* (2021.01); *H01M 50/586* (2021.01)

(58) Field of Classification Search
None
See application file for complete search history.

(56) References Cited

U.S. PATENT DOCUMENTS

| | | | |
|---|---|---|---|
| 3,558,356 A | 1/1971 | Jost | |
| 5,043,235 A | 8/1991 | Seefeldt et al. | |
| 5,521,021 A * | 5/1996 | Alexandres | H01M 50/574 429/174 |

(Continued)

FOREIGN PATENT DOCUMENTS

| | | |
|---|---|---|
| CN | 102165624 A | 8/2011 |
| CN | 106328856 A | 1/2017 |

(Continued)

OTHER PUBLICATIONS

Machine translation of JP 2001-135299 A (Year: 2001).*

(Continued)

*Primary Examiner* — Robert S Carrico
(74) *Attorney, Agent, or Firm* — Birch, Stewart, Kolasch & Birch, LLP (57) ABSTRACT

A cylindrical battery includes a metal can, an electrode assembly located in the metal can, a cap assembly containing a current interruptive device located on a top of the electrode assembly, an upper insulator located between the cap assembly and the electrode assembly, and at least one spring integrally connected to a lower surface of the current interruptive device.

19 Claims, 8 Drawing Sheets

(56) References Cited

U.S. PATENT DOCUMENTS

| | | |
|---|---|---|
| 2005/0118495 A1 | 6/2005 | Kim |
| 2009/0117459 A1 | 5/2009 | Hyung et al. |
| 2011/0008654 A1 | 1/2011 | Kim et al. |
| 2015/0072201 A1 | 3/2015 | Kubota et al. |
| 2018/0123163 A1 | 5/2018 | Park et al. |

FOREIGN PATENT DOCUMENTS

| | | |
|---|---|---|
| CN | 108064421 A | 5/2018 |
| JP | 6-36756 A | 2/1994 |
| JP | 2001-135299 A | 5/2001 |
| JP | 2011-175833 A | 9/2011 |
| KR | 10-2001-0046466 A | 6/2001 |
| KR | 10-2005-0052221 A | 6/2005 |
| KR | 10-0563041 B1 | 3/2006 |
| KR | 10-2009-0046469 A | 5/2009 |
| KR | 10-0966549 B1 | 6/2010 |
| KR | 10-2017-0006809 A | 1/2017 |
| KR | 10-2018-0021265 A | 3/2018 |
| KR | 10-2019-0007709 A | 1/2019 |
| KR | 10-2019-0033900 A | 4/2019 |
| WO | WO 2012/066637 A1 | 5/2012 |
| WO | WO 2018/034471 A1 | 2/2018 |

OTHER PUBLICATIONS

Extended European Search Report for European Application No. 20837397.7, dated Jun. 30, 2022.

International Search Report for PCT/KR2020/008829 mailed on Oct. 29, 2020.

* cited by examiner

[FIG. 1]

CONVENTIONAL ART

[FIG. 2]

CONVENTIONAL ART

CYLINDRICAL BATTERY

TECHNICAL FIELD

Cross Citation with Related Application(s)

This application claims the benefit of Korean Patent Application No. 10-2019-0083862, filed on Jul. 11, 2019, with the Korean Intellectual Property Office, the disclosure of which is incorporated herein by reference in its entirety.

The present disclosure relates to a cylindrical battery.

BACKGROUND ART

As energy prices are increasing due to the depletion of fossil fuels and increasing attention is being paid to environmental pollution, the demand for environmentally-friendly alternative energy sources acts as an essential factor for future life. Thus, research into techniques for generating various kinds of power, such as nuclear energy, solar energy, wind energy, and tidal power, is underway, and power storage apparatuses for more efficient use of the generated energy are also drawing much attention.

Moreover, as technology development and demands for mobile devices and electric vehicles increase, demands for batteries as energy sources are rapidly increasing. Accordingly, many researches on batteries capable of meeting diverse demands have been conducted. In particular, in terms of the material for batteries, the demand for lithium secondary batteries, such as lithium ion batteries and lithium ion polymer batteries, which have advantages such as high energy density, discharge voltage, and output stability, is very high.

The secondary batteries are classified based on how the electrode assembly, having a structure in which a positive electrode, a negative electrode, and a separator interposed between the positive electrode and the negative electrode are stacked, is structured. Typically, the electrode assemblies may include a jelly-roll (wound) type electrode assembly in which long sheet type positive electrodes and negative electrodes are wound in a state where separators are interposed therebetween, and a stacked (laminated) type electrode assembly in which a plurality of positive electrodes and a plurality of negative electrodes, which are cut into predetermined unit sizes, are sequentially stacked in a state where separators are interposed therebetween, and the like. Recently, in order to solve the problems involved in the jelly-roll type electrode assembly and the stacked type electrode assembly, there have been developed a stacked/folded type electrode assembly which is a combination of the jelly-roll type electrode assembly and the stacked type electrode assembly, and has a structure in which unit cells stacked with certain units of the positive electrodes and unit negative electrode are sequentially wound with a separation film or a separator being interposed therebetween.

These electrode assemblies are mounted in a pouch case, a cylindrical can, a prismatic case, and the like depending on the purpose of use to produce a battery.

Among them, the cylindrical battery has the advantages of being easy to manufacture and having a high energy density per weight, and thus, is used as an energy source for portable electric power tools.

Figure 1:
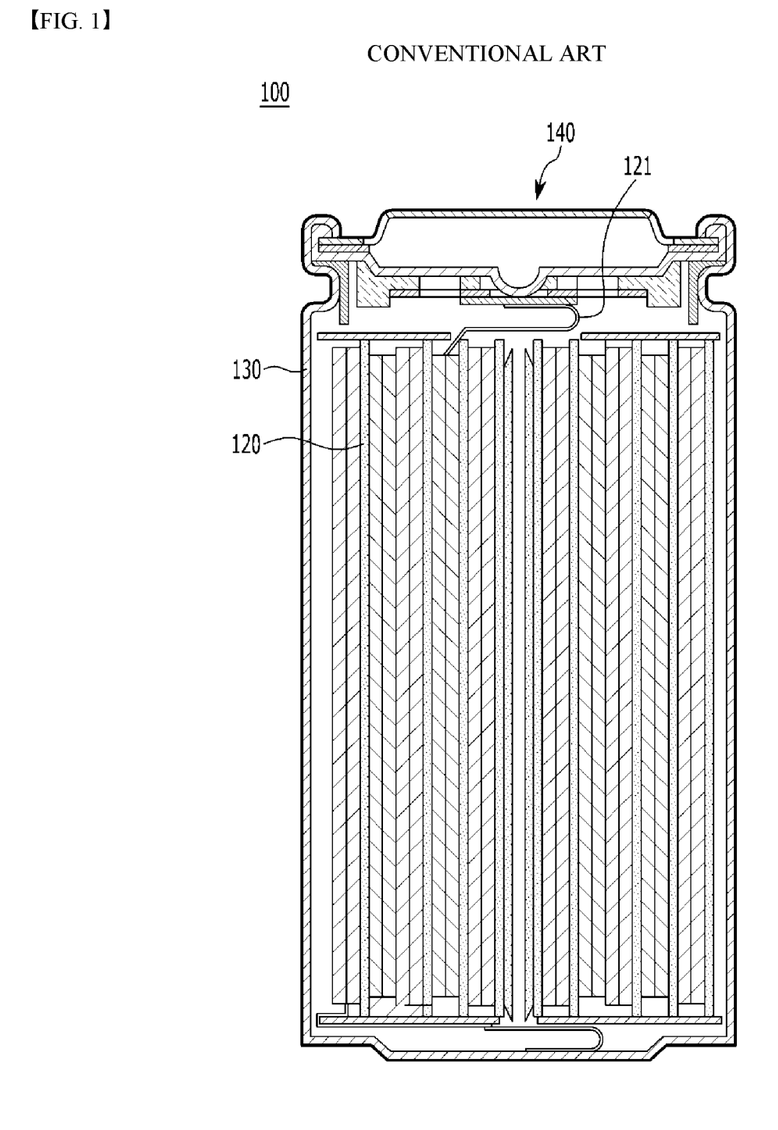
FIG. 1 is a schematic cross-sectional view of a conventional cylindrical battery used in an electric power tool.
Figure 2:
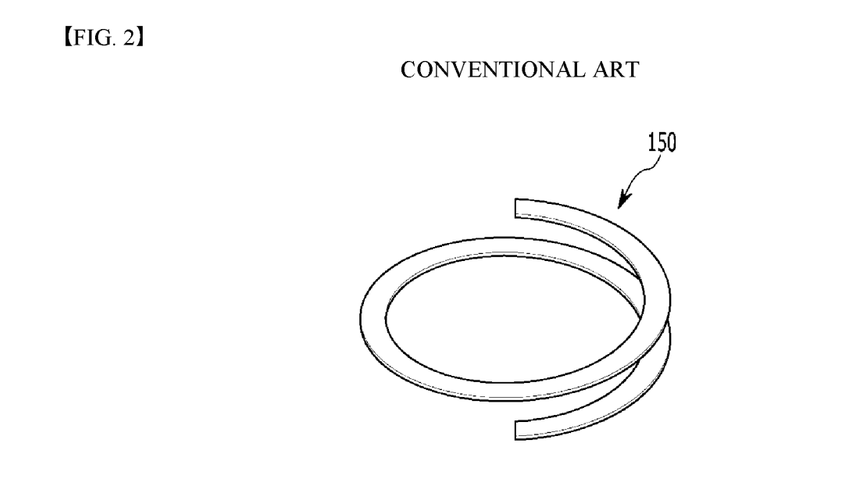
FIG. 2 is a perspective view showing a spring-shaped positive electrode tab.

FIG. 1 is a schematic cross-sectional view of a conventional cylindrical battery used in an electric power tool. FIG. 2 is a schematic view showing a spring-shaped positive electrode tab.

Referring to FIGS. 1 and 2, a cylindrical battery 100 is manufactured by mounting a jelly-roll type electrode assembly 120 in a cylindrical case 130, injecting an electrolyte solution into the cylindrical case 130, then mounting the top cap 140 on the opened top of the cylindrical case 130, and electrically connecting a positive electrode tab 121 to the top cap 140.

An electric power tool that uses the cylindrical battery 100 as an energy source is operated for a few minutes at the shortest and for several hours at the longest. In particular, when the cylindrical battery 100 is operated for a long time, continuous external vibration is transmitted to the inside of the cylindrical battery 100, and a bent part of the positive electrode tab 121 or a welded part between the positive electrode tab 121 and the top cap 140, having the weakest physical rigidity in the internal configurations of the cylindrical battery 100, are broken.

In order to solve these problems, efforts have been made to absorb external vibrations by making the positive electrode tab 150 into a spring shape as shown in FIG. 2.

However, since the positive electrode tabs 121 and 150 are generally made of aluminum and have a thickness of only about 100 micrometers, they are cut by continuous external vibration.

DETAILED DESCRIPTION OF THE INVENTION

Technical Problem

It is an object of the present disclosure to provide a cylindrical battery designed for vibration resistance.

However, the problem to be solved by embodiments of the present disclosure is not limited to the above-described problems, and can be variously expanded within the scope of the technical idea included in the present disclosure.

Technical Solution

A cylindrical battery according to an embodiment of the present disclosure includes a metal can, an electrode assembly located in the metal can, a cap assembly containing a current interruptive device located on a top of the electrode assembly, an upper insulator located between the cap assembly and the electrode assembly, and at least one spring integrally connected to a lower surface of the current interruptive device.

The spring may include a first support part, a second support part, and a cushioning part.

A first surface of the first support part may be integrally connected to the lower surface of the current interruptive device.

A second surface of the first support part may integrally connected to the cushioning part.

The cushioning part may be located between the first support part and the second support part.

The first support part and the second support part may have the same shape.

A first surface of the second support part may be integrally connected to the cushioning part.

The second support part may be located on the upper insulator.

The entirety of a second surface of the second support part may come into contact with the upper insulator.

The second support part may extend to a greater extent toward a center of the spring than the first support part extends toward the center of the spring.

The second support part may extend to a greater extent away from the center of the spring than the first support part extends away from the center of the spring.

The first support part may have a disk shape with a hollow center.

The cushioning part may have a structure in which one or more plate springs bent to have a wave shape are stacked.

The cushioning part may be a coil type spring.

The at least one spring may be a plurality of springs integrally connected to the lower surface of the current interruptive device.

The electrode assembly may have a positive electrode tab passing through a central part of the spring.

A diameter of the spring may be less than a diameter of the current interruptive device.

Advantageous Effects

As described above, the cylindrical battery according to the embodiment of the present disclosure includes a spring integrally connected to the cap assembly, thereby being able to prevent the bent part of the positive electrode tab and the welded part of the positive electrode tab and the cap assembly from being broken due to external vibration.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Figure 3:
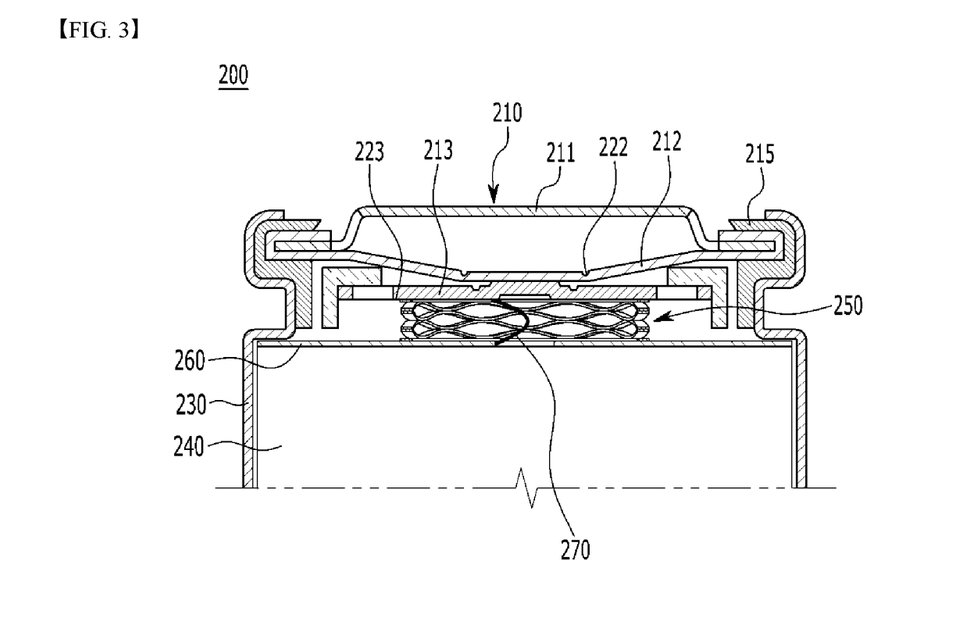
FIG. 3 is a partial, schematic cross-sectional view showing a cylindrical battery according to an embodiment of the present disclosure.
Figure 4:
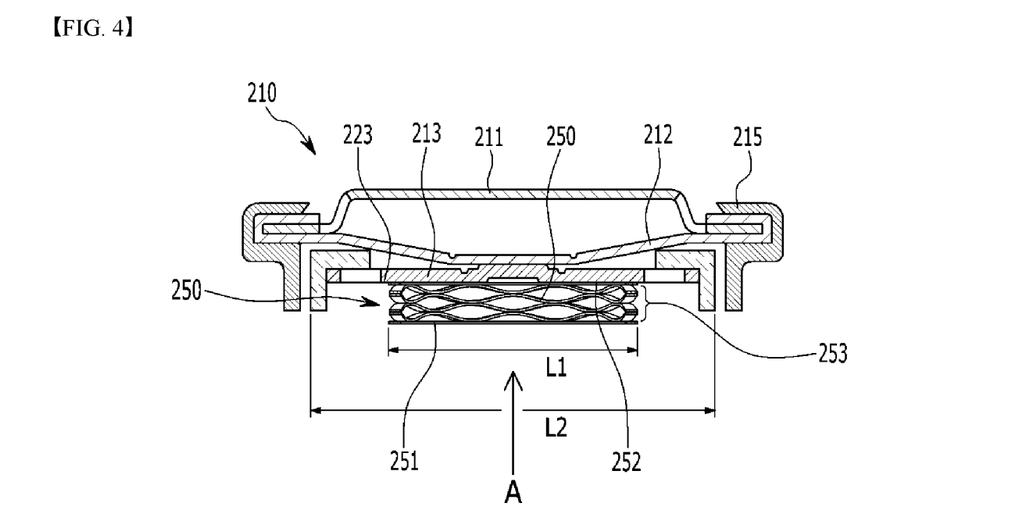
FIG. 4 is a schematic cross-sectional view showing the top cap assembly of FIG. 3.
Figure 5:
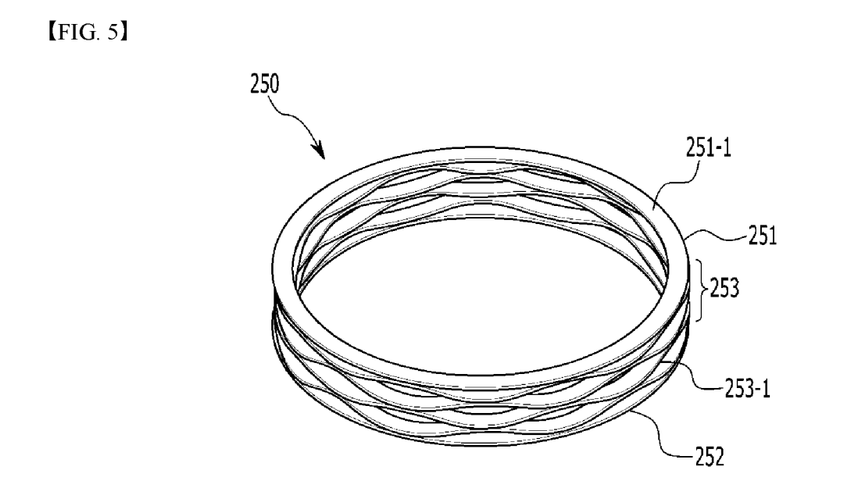
FIG. 5 is a perspective view showing the spring of FIG. 3.
Figure 6:
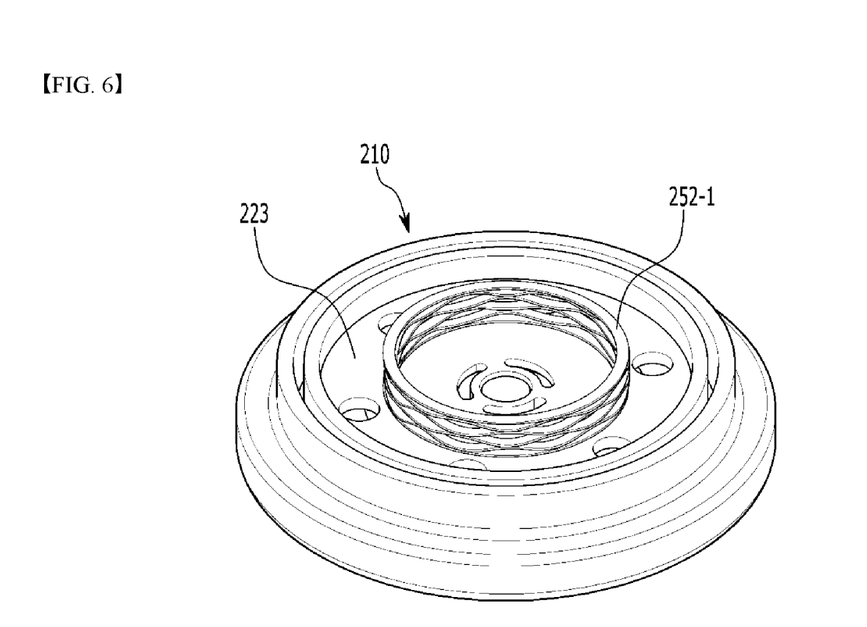
FIG. 6 is a perspective view of the cap assembly of FIG. 4 as viewed from the direction A.

FIG. 3 is a partial, schematic cross-sectional view showing a cylindrical battery according to an embodiment of the present disclosure. FIG. 4 is a schematic cross-sectional view showing the top cap assembly of FIG. 3. FIG. 5 is a perspective view showing the spring of FIG. 3. FIG. 6 is a perspective view of the cap assembly of FIG. 4 as viewed from the direction A.

Referring to FIG. 3, the cylindrical battery 200 may insert a jelly-roll type electrode assembly 240 into a metal can 230 and mount a cap assembly 210 on the opened top of the metal can 230. The cap assembly 210 may include a top cap 211, a safety vent 212, a current interruptive device 213, and a gasket 215.

The top cap 211 may form a positive electrode terminal so as to protrude to the outside of the cylindrical battery 200. The top cap 211 may be electrically connected to the safety vent 212 along the edge of the safety vent 212.

The safety vent 212 may have a predetermined notch 222 formed thereon so that it is ruptured by the high-pressure gas of the cylindrical battery 200. The safety vent 212 maintains a structure that protrudes downward when the cylindrical battery 200 operates normally. However, when gas is generated inside the cylindrical battery 200 and the internal pressure rises, the safety vent 212 can be protruded upward and ruptured to discharge an internal gas.

The current interruptive device 213 may interrupt the current and eliminate the internal pressure when the cylindrical battery 200 operates abnormally. The current interruptive device 213 may be mounted in a space between the electrode assembly 240 and the safety vent 212.

A spring 250 may be integrally connected to the lower surface 223 of the current interruptive device 213.

Referring to FIGS. 3 and 5, the spring 250 may include a first support part 251, a second support part 252, and a cushioning part 253. The first support part 251 may be in a shape of a disk having a hollow central part on a plan view. The first support part 251 may include one surface 125-1 and the other surface (not shown) formed opposite to the one surface 125-1. One surface 125-1 may have a structure integrally connected to the lower surface 223 of the current interruptive device 213.

Through such an integrated structure, since external vibration is first transmitted to the cushioning part 253 via the first support part 251 and relieved, the external vibration is not transmitted to the positive electrode tab 270. Thus, it is possible to prevent a bent part of the positive electrode tab 270 from being broken or a welded part of the positive electrode tab 270 and the cap assembly 210 from being broken due to external vibration.

The cushioning part 253 formed between the first support part 251 and the second support part 252 is not particularly limited as long as it is a structure capable of absorbing external vibration, but as an example, it may be a structure in which one or more plate springs 253-1 bent to a wave shape are stacked.

Referring to FIGS. 3, 5 and 6, the second support part 252 may be formed in a shape equal to the first support part 251. One surface (not shown) of the second support part 252 may be integrally connected to the cushioning part 253, and the other surface 252-1 of the second support part 252 may come into contact with the upper insulator 260. In particular, the whole of the other surface 252-1 of the second support part 252 can be seated on the upper insulator 260 to secure a stable support force.

Referring to FIGS. 3 and 4, in order to form a stable structure in which the spring 250 is connected to the lower surface 223 of the current interruptive device 213, it is preferable that the diameter L1 of the spring 250 does not exceed the diameter L2 of the current interruptive device 213. Further, it is preferable that the spring 250 does not come into contact with the positive electrode tab 270 passing through a central part of the spring 250.

Figure 7:
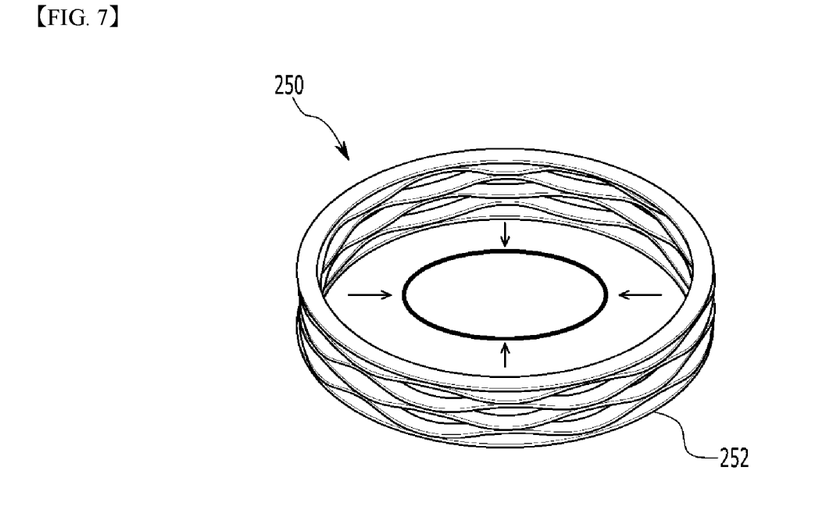
FIG. 7 is a modified example of the spring of FIG. 5.

FIG. 7 is a modified example of the spring of FIG. 5.

Referring to FIGS. 3 and 7, the second support part 252 can extend toward the center of the spring 250 so that the area where the second support part 252 comes into contact with the upper insulator 260 can be further expanded.

Through such a structure, not only the second support part 252 can secure a stable support force, but also while external vibration is absorbed by the cushioning part 253, the pressure applied to the upper insulator 260 by the second support part 252 can be dispersed.

Figure 8:
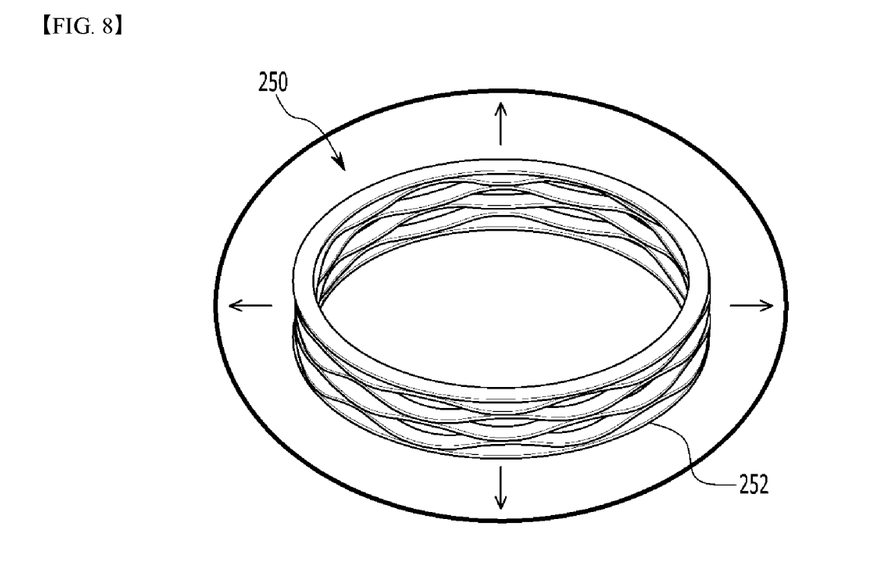
FIG. 8 is a modified example of the spring of FIG. 5.

FIG. 8 is a modified example of the spring of FIG. 5.

Referring to FIGS. 3 and 8, the second support part 252 may extend outward away from the center of the spring 250 so that the area where the second support part 252 contacts the upper insulator 260 can be further expanded.

Through such a structure, not only the second support part 252 can secure a stable support force, but also while external vibration is absorbed by the cushioning part 253, the pressure applied to the upper insulator 260 by the second support part 252 can be dispersed.

Figure 9:
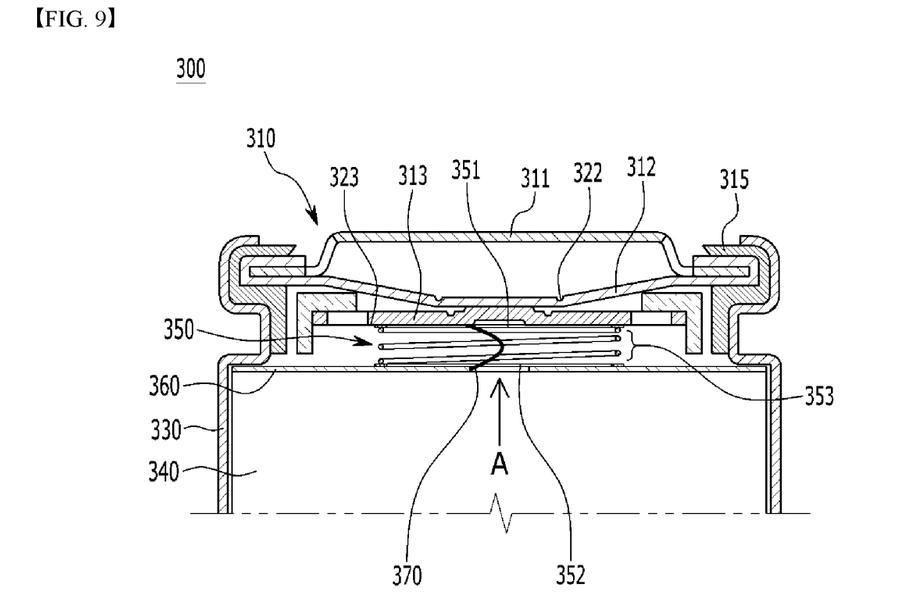
FIG. 9 is a partial, schematic cross-sectional view showing another embodiment according to the present disclosure.
Figure 10:
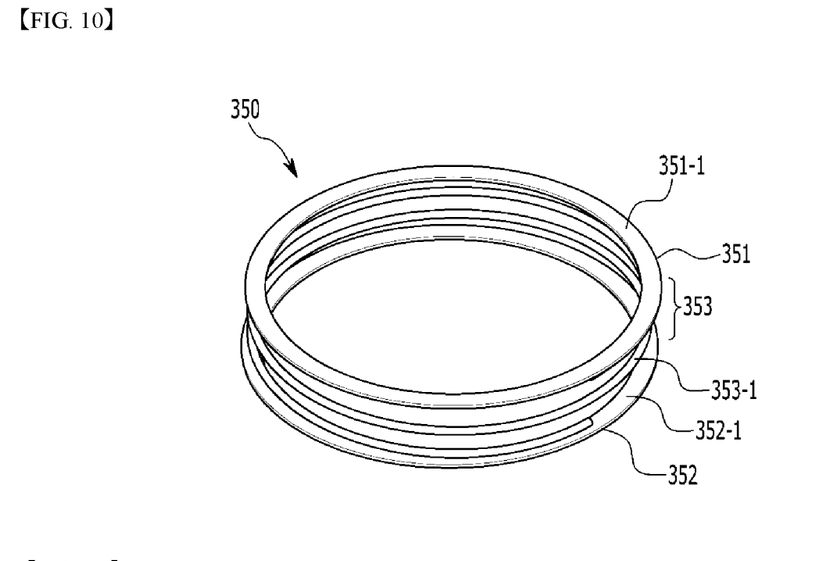
FIG. 10 is a perspective view showing the spring of FIG. 9.
Figure 11:
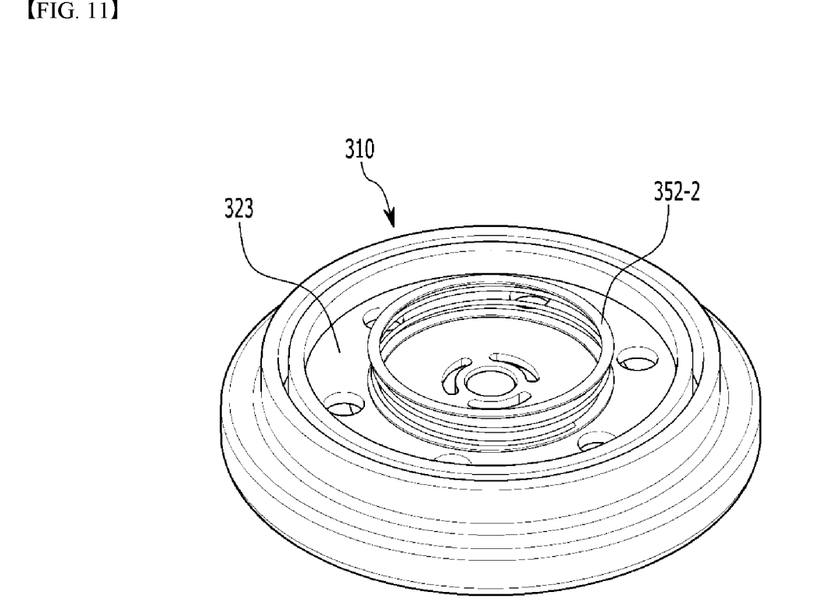
FIG. 11 is a perspective view of the top cap assembly of FIG. 9 as viewed from the direction A.

FIG. 9 is a partial, schematic cross-sectional view showing another embodiment according to the present disclosure. FIG. 10 is a perspective view showing the spring of FIG. 9. FIG. 11 is a schematic diagram of the top cap assembly of FIG. 9 as viewed from the direction A.

Referring to FIG. 9, the cylindrical battery 300 is configured such that an electrode assembly 340 can be mounted on a metal can 330. The cap assembly 310 may include a top cap 311, a safety vent 312, a current interruptive device 313, and a gasket 315. The safety vent 312 may have a predetermined notch 322. The spring 350 may be integrally connected to the lower surface 323 of the current interruptive device 313.

Referring to FIGS. 9 and 10, the spring 350 may include a first support part 351, a second support part 352, and a cushioning part 353. The first support part 351 may have a disk shape having an empty center on a plan view. The first support part 351 may include one surface 325-1 and the other surface (not shown) formed opposite to the one surface 325-1. One surface 325-1 may have a structure integrally connected to the lower surface 323 of the current interruptive device 313.

Through such an integrated structure, the external vibration can be first transferred to the cushioning part 353 via the first support part 351 and absorbed. Therefore, it is possible to prevent the bent part of the positive electrode tab 370 from being broken or the welded part of the positive electrode tab 370 and the cap assembly 310 from being broken due to external vibration.

Referring to FIGS. 9 and 11, a cushioning part 353 may be formed between the first support part 351 and the second support part 352. The cushioning part 353 may be a coil type spring 353-1. The second support part 352 may be formed in a shape equal to the first support part 251. One surface 352-1 of the second support part 352 may be integrally connected to the cushioning part 353. The other surface 352-2 of the second support part 352 may come into contact with the upper insulator 360. In particular, the whole of the other surface 352-2 of the second support part 352 can be seated on the upper insulator 360 to secure a stable support force.

Figure 12:
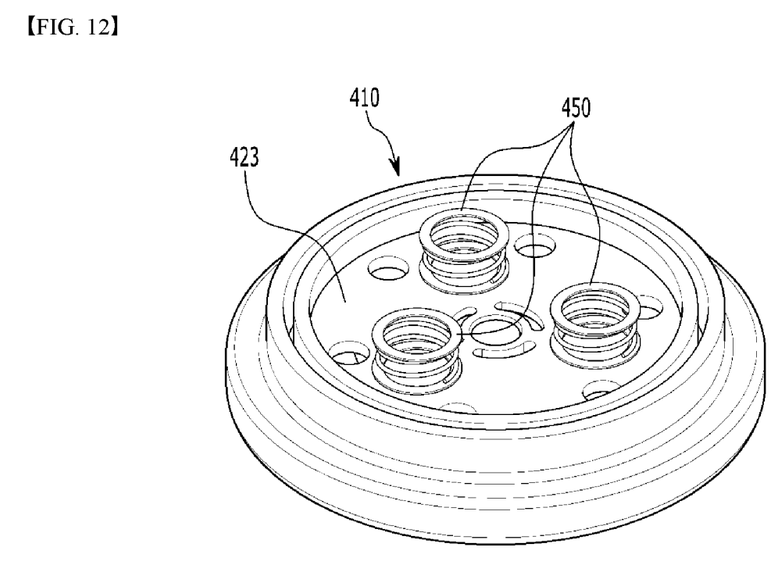
FIG. 12 is a perspective view showing another embodiment according to the present disclosure.

FIG. 12 is a perspective view showing another embodiment according to the present disclosure.

Referring to FIGS. 10 and 12, the cap assembly 410 has a structure in which a plurality of springs 450 are integrally connected to the lower surface 423 of the cap assembly 410. With such a structure, external vibrations can be dispersed and absorbed by the plurality of springs 450.

Based on the above disclosure, this is to be understood by those of ordinary skill in the art that various applications and modifications can be made within the scope of the present disclosure.

The invention claimed is:

1. A cylindrical battery, comprising:
   a metal can;
   an electrode assembly located in the metal can;
   a cap assembly containing a current interruptive device located on a top of the electrode assembly;
   an upper insulator located between the cap assembly and the electrode assembly; and
   at least one spring having a first end integrally connected to a lower surface of the current interruptive device and a second end contacting an upper surface of the upper insulator.

2. The cylindrical battery according to claim 1, wherein the at least one spring includes a first support part, a second support part, and a cushioning part.

3. The cylindrical battery according to claim 2, wherein a first surface of the first support part is integrally connected to the lower surface of the current interruptive device.

4. The cylindrical battery according to claim 3, wherein a second surface of the first support part is integrally connected to the cushioning part.

5. The cylindrical battery according to claim 2, wherein a second surface of the first support part is integrally connected to the cushioning part.

6. The cylindrical battery according to claim 2, wherein the cushioning part is located between the first support part and the second support part.

7. The cylindrical battery according to claim 2, wherein the first support part and the second support part have a same shape.

8. The cylindrical battery according to claim 2, wherein a first surface of the second support part is integrally connected to the cushioning part.

9. The cylindrical battery according to claim 8, wherein an entirety of a second surface of the second support part comes into contact with the upper insulator.

10. The cylindrical battery according to claim 2, wherein the second support part is located on the upper insulator.

11. The cylindrical battery according to claim 10, wherein an entirety of a second surface of the second support part comes into contact with the upper insulator.

12. The cylindrical battery according to claim 2, wherein the second support part extends to a greater extent toward a center of the spring than the first support part extends toward the center of the spring.

13. The cylindrical battery according to claim 2, wherein the second support part extends to a greater extent away from a center of the spring than the first support part extends away from the center of the spring.

14. The cylindrical battery according to claim 2, wherein the first support part has a disk shape with a hollow center.

15. The cylindrical battery according to claim 2, wherein the cushioning part has a structure in which one or more plate springs bent to have a wave shape are stacked.

16. The cylindrical battery according to claim 2, wherein the cushioning part is a coil type spring.

17. The cylindrical battery according to claim 1, wherein the at least one spring is provided as a plurality of springs integrally connected to the lower surface of the current interruptive device.

18. The cylindrical battery according to claim 1, wherein a diameter of the spring is less than a diameter of the current interruptive device.

19. A cylindrical battery, comprising:
a metal can;
an electrode assembly located in the metal can;
a cap assembly containing a current interruptive device located on a top of the electrode assembly;
an upper insulator located between the cap assembly and the electrode assembly; and
at least one spring integrally connected to a lower surface of the current interruptive device,
wherein the electrode assembly has a positive electrode tab passing through a central part of the spring.

* * * * *